(12) United States Patent
Weiss et al.

(10) Patent No.: US 12,712,362 B2
(45) Date of Patent: Aug. 18, 2026

(54) DIGITAL ELECTRICITY CONTROLLER

(71) Applicant: VoltServer Inc., East Greenwich, RI (US)

(72) Inventors: Jeffrey A. Weiss, Lincoln, RI (US); Stephen S. Eaves, Charlestown, RI (US); Jonathan J. Casey, North Kingstown, RI (US)

(73) Assignee: VoltServer Inc., East Greenwich, RI (US)

( * ) Notice: Subject to any disclaimer, the term of this patent is extended or adjusted under 35 U.S.C. 154(b) by 0 days.

(21) Appl. No.: 19/059,925

(22) Filed: Feb. 21, 2025

(65) Prior Publication Data

US 2025/0273958 A1 Aug. 28, 2025

Related U.S. Application Data

(60) Provisional application No. 63/558,906, filed on Feb. 28, 2024.

(51) Int. Cl.
*H02J 13/00* (2026.01)
*H02J 3/00* (2026.01)
(Continued)

(52) U.S. Cl.
CPC ............ *H02J 3/0012* (2020.01); *H02J 13/10* (2026.01); *H02J 13/12* (2026.01)

(58) Field of Classification Search
CPC ............... H02J 3/0012; H02J 13/00001; H02J 13/00002; H02J 3/001; H02J 13/00017; H02J 13/0004; H04L 12/10
See application file for complete search history.

(56) References Cited

U.S. PATENT DOCUMENTS 8,068,937 B2 11/2011 Eaves
8,781,637 B2 7/2014 Eaves
(Continued)

FOREIGN PATENT DOCUMENTS

WO 2022/204582 A1 9/2022
WO 2023/014595 A1 2/2023

OTHER PUBLICATIONS

ISA/European Patent Office, International Search Report and Written Opinion of the International Searching Authority, Application No. PCT/US2025/016787, dated Sep. 8, 2025, 10 pages.

*Primary Examiner* — Elim Ortiz
(74) *Attorney, Agent, or Firm* — Saul Ewing LLP

(57) ABSTRACT

A method for operating a controller in a fault managed power (FMP) system, includes connecting the FMP front-end circuit of the controller electrically in parallel with the FMP transmission line, receiving power by the FMP front-end circuit and the output control and conditioning circuit of the controller from the FMP transmission line when the FMP transmitter transmits power over the transmission line during power transfer periods, in the low power and the high-power modes. It includes electrically isolating the output control and conditioning circuit from the FMP front-end circuit and the FMP transmission line during power sample periods and it causes the controller to perform one or more of receiving input data from a human operator, receiving sensor data from a sensor, presenting output data for the human operator to observe, or transmitting data to and receiving data from the FMP transmitter.

37 Claims, 8 Drawing Sheets

(51) Int. Cl.

| | |
|---|---|
| *H02J 3/0012* | (2026.01) |
| *H02J 13/10* | (2026.01) |
| *H02J 13/12* | (2026.01) |

(56) References Cited

U.S. PATENT DOCUMENTS

| | | | |
|---|---|---|---|
| 9,184,795 | B2 | 11/2015 | Eaves |
| 9,419,436 | B2 | 8/2016 | Eaves et al. |
| 9,853,689 | B2 | 12/2017 | Eaves |
| 9,893,521 | B2 | 2/2018 | Lowe et al. |
| 10,714,930 | B1 | 7/2020 | Weiss et al. |
| 10,735,105 | B2 | 8/2020 | Goergen et al. |
| 11,892,494 | B2 | 2/2024 | Mlyniec et al. |
| 12,149,067 | B2 | 11/2024 | Casey |
| 2023/0040178 | A1 * | 2/2023 | Potterf .................. G01R 31/52 |
| 2023/0378741 | A1 | 11/2023 | Bolouri-Saransar et al. |
| 2025/0038522 | A1 | 1/2025 | Casey |
| 2025/0149963 | A1 | 5/2025 | Lutz et al. |
| 2025/0149964 | A1 | 5/2025 | Lutz et al. |
| 2025/0150292 | A1 | 5/2025 | Lutz et al. |

* cited by examiner

DIGITAL ELECTRICITY CONTROLLER

CROSS-REFERENCE TO RELATED APPLICATION

This application claims the benefit of U.S. Application No. 63/558,906, filed Feb. 28, 2024, which is incorporated herein by reference in its entirety.

TECHNICAL FIELD

The present disclosure relates to fault managed power (FMP) systems and more particularly to a controller for FMP systems.

BACKGROUND ART

Digital electrical power, or digital electricity, can be characterized as any power format where electrical power is distributed in discrete, controllable units of energy. Packet energy transfer (PET) is a type of digital electric power protocol disclosed in U.S. Pat. No. 8,068,937 and U.S. Pat. No. 8,781,637 (each incorporated by reference herein and together referred to as Eaves 2012). This type of power may also be referred to as FMP or Fault Managed Power in Underwriter Laboratory's (UL's) 1400-1 Outline of Investigation and the National Electric Code's (NEC's) or NFPA 70's Article 726 defining Class 4. The terms, digital electricity, digital power, PET, and FMP may be used interchangeably herein. This type of power system includes various modes of power distribution where power is delivered in a sequence of high voltage DC pulses and the transmission line is characterized between each pulse or for each pulse to determine if a fault has occurred. In general, a line fault will be detected within one or two pulse intervals and the power safely disconnected prior to causing an injury or fire.

As described in Eaves 2012, a source controller and a load controller are connected by power transmission lines. The source controller of Eaves 2012 periodically isolates (disconnects) the power transmission lines from the power source and analyzes, at a minimum, the voltage characteristics present at the source controller terminals directly before and after the lines are isolated. The time period when the power lines are isolated was referred to by Eaves 2012 as the "sample period", and the time period when the source is connected is referred to as the "transfer period". The rate of rise and decay of the voltage on the lines before, during and after the sample period reveal if a fault condition is present on the power transmission lines. Measurable faults include, but are not limited to, a short circuit across the lines, high line resistance in series for one or both lines, or the presence of an individual or other foreign object that has improperly come in contact with both lines simultaneously or one of the lines to ground Eaves 2012 also describes digital information that may be sent between the source and load controllers over the power transmission lines to further enhance safety or provide general characteristics of the energy transfer, such as total energy or the voltage at the load controller terminals. One method for communications on the same digital power transmission lines as used for power was further described and refined in U.S. Pat. No. 9,184,795 (Eaves Communication Patent). One application of a digital power distribution system is to safely distribute direct-current (DC) power in digital format and at elevated voltage from the source side of the system to the load side. U.S. Pat. No. 9,853,689 (Eaves Power Elements) describes the packaging of the source side components of Eaves 2012, in various configurations, into a device referred to as a digital power transmitter.

U.S. Pat. No. 9,419,436 (Eaves Receiver Patent) describes the packaging of various configurations of the load side components of Eaves 2012 into a device referred to as a digital power receiver. U.S. Pat. No. 9,893,521, "Digital Power Network Method and Apparatus", hereafter referred to as "Lowe 2014", introduced the concept of multiple sources of power and multiple loads connected safely in a digital power network using Packet Energy Transfer. The concept of a power control element (PCE) was introduced in Lowe 2014 as a primary component in a digital power network. U.S Pat. No. 11,892,494 (Mlyniec 2017) describes methods for verifying digital electricity line integrity, which includes applying a bias to the transmission line during the sample period, synchronizing the start times of respective sample periods on first and second transmission lines, among other methods. U.S. Pat. No. 10,714,930 (Weiss 2018) describes the usage of carrier wave detection to measure the impedance of a transmission line in a power-distribution system.

U.S. application Ser. No. 18/504,603 (Lutz '403), U.S. application Ser. No. 18/504,614 (Lutz '614) and U.S. application Ser. No. 18/504,620 (Lutz '620) share a largely common specification and disclose methods and apparatus for a hot-pluggable receiver, a transmitter that maintains safety even in the absence of a receiver, and further improvements on a multi-drop architecture in a digital electricity system, respectively.

U.S. application Ser. No. 18/911,762 (Casey 2024) is a continuation of U.S. Pat. No. 12,149,067that describes a method to calculate the crossline resistance and capacitance from the measurements with and without a single known bias.

Further improvements in PET or FMP systems are desirable, especially as commercial demand for such systems grow.

SUMMARY OF THE EMBODIMENTS

The benefits and advantages of the present disclosure over existing systems will be readily apparent from this Summary of the Embodiments and the Detailed Description of Specific Embodiments to follow.

One skilled in the art will appreciate that the present teachings can be practiced with embodiments other than those summarized or disclosed below.

In accordance with one embodiment of this disclosure there is a method for operating a controller in a fault managed power (FMP) system, the FMP system including a FMP transmitter connected to a FMP transmission line, the FMP transmitter further connected to a power source. The FMP transmitter is configured to transmit power in pulses, in a low power mode or a high-power mode, over the FMP transmission line during power transfer periods and to isolate the source from the transmission line during power sample periods, the controller comprising a FMP-front-end circuit and an output control and conditioning circuit. The method includes connecting the FMP front-end circuit of the controller electrically in parallel with the FMP transmission line and receiving power by the FMP front-end circuit and the output control and conditioning circuit of the controller from the FMP transmission line when the FMP transmitter transmits power over the transmission line during power transfer periods, in both the low power mode and the high-power mode, to operate the controller. The method further includes electrically isolating the output control and conditioning circuit of the controller from the FMP front-end circuit and the FMP transmission line during power sample periods and causing the controller to perform one or more functions. The functions include receiving input data from a human operator, receiving sensor data from a sensor of the controller, presenting output data for the human operator to observe, or transmitting data to and receiving data from the FMP transmitter.

In other aspects of this disclosure one or more of the following features may be included. The method may include at least one FMP receiver having an FMP front-end circuit and an output control and conditioning circuit and it may include connecting the FMP front-end circuit of the at least one receiver to the FMP transmission line and connecting the output control and conditioning circuit to a load. It may include electrically connecting the output control and conditioning circuit of the at least one FMP receiver to the transmission line during power transfer periods when the FMP transmitter is transmitting in high-power mode and electrically isolating the output control and conditioning circuit of the at least one receiver from the FMP front-end circuit and from the transmission line during power transfer periods when the FMP transmitter is transmitting in low power mode. The method may include electrically isolating the output control and conditioning circuit of the at least one receiver from the FMP front-end circuit and from the FMP transmission line during power sample periods and it may include causing the controller to transmit data to and receive data from the at least one FMP receiver. The method may also include at least one additional controller and the method further includes causing the controller to transmit data to and receive data from the at least one additional controller. The FMP transmitter may operate in the low power mode when the load associated with the at least one receiver is shed in response to the FMP transmitter or when a fault condition on the FMP transmission line is detected. The controller may include an interface having one or more of a display for the human operator to view data, a speaker to output data via audio to the human operator, and input controls for the human operator to input data. The sensor may include one or more of a temperature sensor, a humidity sensor, an ambient light sensor, a pressure sensor, and an RF sensor and the data includes one or more of temperature data, humidity data, ambient light data, pressure data, and RF data. The method may further include transmitting data to and receiving data from the FMP transmitter includes bidirectionally communicating the data over the FMP transmission line using modulated data pulses during the sample periods.

In yet other aspects of the disclosure one or more of the following features may be included. The modulated data pulses may be modulated onto the FMP transmission line at a frequency greater than a frequency of the power sample periods. The method may include transmitting data to and receiving data from the FMP transmitter includes bidirectionally communicating the data using an out-of-band communication protocol. The FMP transmission line may comprise a CAT5 or CAT6 cable. The FMP transmitter may transmit pulses having a first voltage in the high-power mode. The FMP transmitter may transmit pulses operating in the low power mode, the method includes reducing the first voltage to a lower, second voltage. When the FMP transmitter transmits pulses operating in the low power mode, the method may include maintaining the first voltage for the pulses and reducing the duty cycle of the pulses. The controller may continue to operate provided the detected fault condition does not produce an impedance on the FMP transmission line causing the low power mode pulses to be below a minimum operating voltage for the controller. The method may further include connecting the FMP front-end circuit of the controller to the FMP transmission line or disconnecting the FMP front-end circuit of the controller from the FMP transmission line while the FMP transmitter is transmitting power to the FMP transmission line without disrupting operation of the FMP transmitter.

In another embodiment there is a controller for use in a fault managed power (FMP) system. The FMP system includes a FMP transmitter connected to a FMP transmission line, the FMP transmitter is further connected to a power source and configured to transmit power in pulses, in a low power mode or a high-power mode, over the FMP transmission line during power transfer periods and to isolate the source from the transmission line during power sample periods. The controller includes a FMP front-end circuit configured to be connected in parallel to the FMP transmission line and an output control and conditioning circuit having an input port. The output control and conditioning circuit includes a capacitance connected in parallel across the input port of the output control and conditioning circuit and a voltage regulator having an input and an output. The input is connected to the capacitance and to the input port of the output control and conditioning circuit. There is an interface device connected to the output of the voltage regulator and a processor and memory connected to the output of the voltage regulator. The processor is in communication with the interface device and a communication device and the memory stores instructions that when executed by the processor cause one or more functions. The functions include the interface device to receiving input data from a human operator or a sensor, the interface device presenting output data for the human operator to observe, or the communication device to transmitting data to and receive data from the FMP transmitter. There is also at least one switch connected between the FMP front-end circuit and the input port of the output control and conditioning circuit. The at least one switch is configured to connect the output control and conditioning circuit to the FMP front-end circuit and the FMP transmission line to receive power from the FMP transmission line when the FMP transmitter transmits power, in both the low power mode and the high-power mode, and for electrically isolating output control and conditioning circuit from the FMP front-end circuit and the FMP transmission line during power sample periods.

In other aspects of this disclosure one or more of the following features may be included. The FMP system may include at least one FMP receiver having an FMP front-end circuit and an output control and conditioning circuit. The FMP front-end circuit of the at least one receiver may be connected to the FMP transmission line and the output control and conditioning circuit may be connected to a load. The output control and conditioning circuit of the at least one FMP receiver may be configured to connect to the transmission line during power transfer periods when the FMP transmitter is transmitting in high-power mode and is configured to electrically isolate the output control and conditioning circuit of the at least one receiver from the FMP front-end circuit and from the transmission line during power transfer periods when the FMP transmitter is transmitting in low power mode. The output control and conditioning circuit of the at least one FMP receiver may be configured to electrically isolate the output control and conditioning circuit of the at least one receiver from the FMP front-end circuit and from the FMP transmission line during power sample periods. The processor causes the communication device to transmit data to and receive data from the at least one receiver. The FMP system may include at least one additional controller, and the processor may cause the communication device to transmit data to and receive data from the at least one additional controller. The FMP transmitter may operate in the low power mode when the load associated with the at least one receiver is shed in response to the FMP transmitter or when a fault condition on the FMP transmission line is detected. The interface may include one or more of a display for the human operator to view data, a speaker to output data via audio to the human operator, and input controls for the human operator to input data. The sensor may be one or more of a temperature sensor, a humidity sensor, an ambient light sensor, a pressure sensor, and an RF sensor and the data includes one or more of temperature data, humidity data, ambient light data, pressure data, and RF data.

In other aspects of this disclosure one or more of the following features may be included. The processor may cause the communications device to bidirectionally communicate the data over the FMP transmission line using modulated data pulses during the sample periods. The processor may cause the communications device to modulate data pulses onto the FMP transmission line at a frequency greater than a frequency of the power sample periods. The processor may cause the communications device to bidirectionally communicate the data using an out-of-band communication protocol. The FMP transmission line may comprise a CAT5 or CAT6 cable. The FMP transmitter may transmit pulses having a first voltage in the high-power mode. When the FMP transmitter transmits pulses operating in the low power mode, the FMP transmitter may reduce the first voltage to a lower, second voltage. When the FMP transmitter transmits pulses operating in the low power mode, the FMP transmitter may maintain the first voltage for the pulses and reduce the duty cycle of the pulses. The controller may continue to operate provided the detected fault condition does not produce an impedance on the FMP transmission line causing the low power mode pulses to be below a minimum operating voltage for the controller. The controller may further comprise a synchronizer device interconnecting the FMP front-end circuit and the output control and conditioning circuit to enable connecting the FMP front-end circuit to the FMP transmission line and disconnecting the FMP front-end circuit of the controller from the FMP transmission line while the FMP transmitter is transmitting power to the FMP transmission line without disrupting operation of the FMP transmitter. The communications device of the FMP front-end circuit may be configured to transmit data to and receive data from the FMP transmitter.

These and other features of the disclosure will be apparent from the following detailed description and the accompanying figures.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figures 1A, 1B:
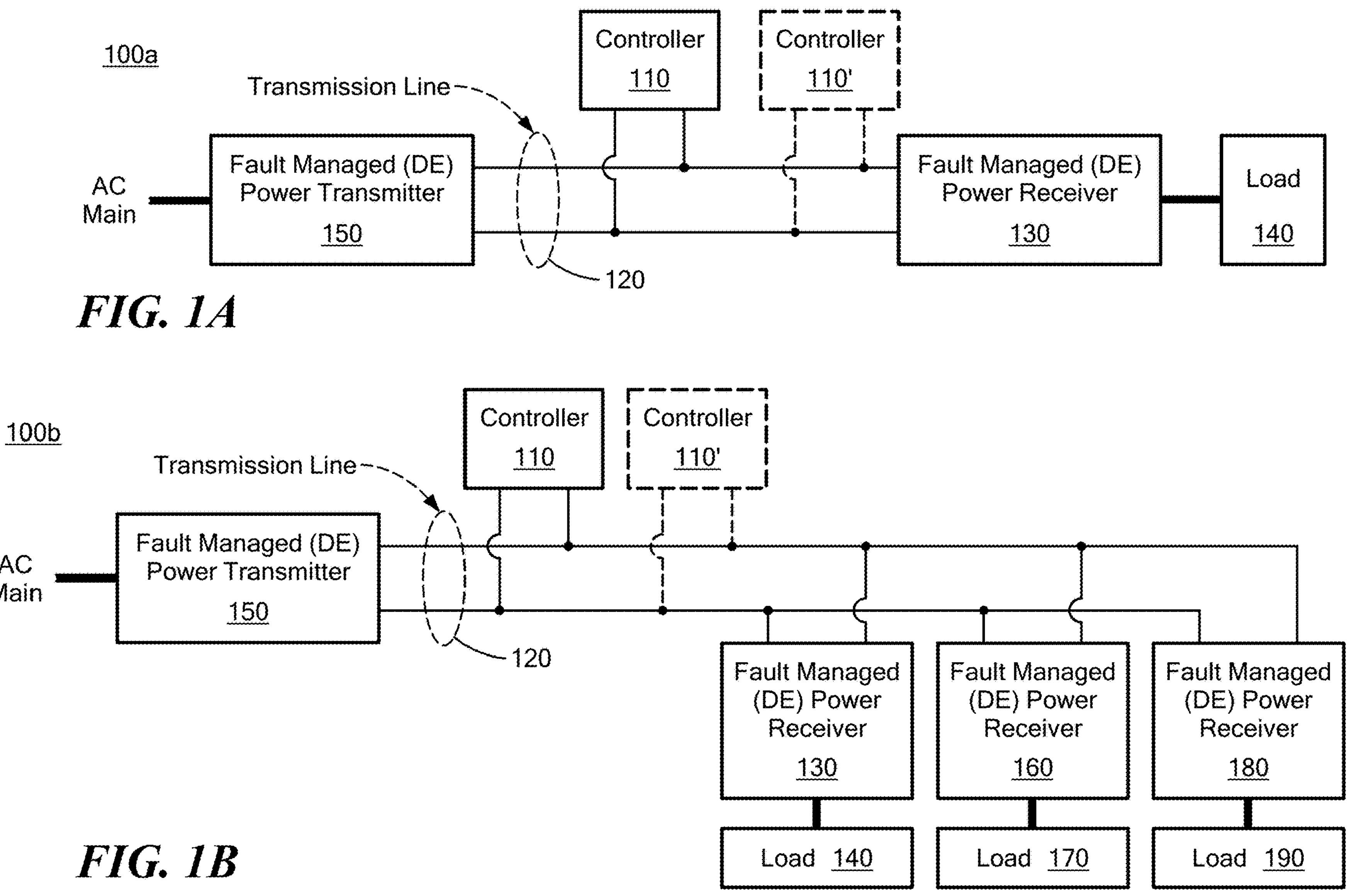
FIG. 1A is block diagram of an FMP transmission system including a digital electricity controller, according to an aspect of this disclosure, and a single receiver and load.
FIG. 1B is block diagram of an FMP transmission system including a digital electricity controller, according to an aspect of this disclosure, and multiple receivers and loads.

The disclosure and the various features and advantageous details thereof are explained more fully with reference to the non-limiting embodiments and examples that are described and/or illustrated in the accompanying drawings and detailed in the following description. Various aspects of the subject matter discussed in greater detail below may be implemented in any of numerous ways, as the subject matter is not limited to any particular manner of implementation. Examples of specific implementations and applications are provided primarily for illustrative purposes.

Unless otherwise defined, used, or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms "includes," "including," "comprises," and "comprising" specify the presence of the stated elements or steps but does not preclude the presence or additional of one or more other elements or steps.

This disclosure in general relates to power distribution system safety protection devices, for example, power distribution systems with electronic monitoring to detect and disconnect power in the event of an electrical fault or safety hazard, particularly where an individual has contacted exposed conductors. This disclosure is applicable to general power distribution and, exemplifications, to, e.g., electric vehicle charging, telecommunications and/or alternative energy power systems.

More specifically, this disclosure relates to a power controller connected to a FMP transmission line in parallel with a FMP transmitter and possibly one or more FMP receivers/loads. The power controller may draw power from the FMP transmitter via the FMP transmission line within the same time intervals as are available to provide power to any FMP receivers/loads connected. The power controller of this disclosure may communicate data to and from the FMP transmitter or any FMP receivers using the FMP transmission line or using an out-of-band communication protocol. The power controller of this disclosure may also provide user notifications, measurement data from sensors, and/or controls.

The power controller of this disclosure is particularly suited for an FMP transmission system which operates in either a high-power mode or a low power mode. One such system is described in Goergen in U.S. Pat. No. 10,735,105. The circuit of Goergen provides Power over Ethernet (PoE) DC power at approximately 57 volts until a suitable high-power receiver is detected, then the voltage is increased to multiple hundreds of volts to deliver full power. While Goergen discloses delivery of power at two different voltage levels, it does not disclose a power controller as described herein which operates in both the high-power and low power modes, communicates data to and from the FMP transmitter, and provide user notifications, measurement data, and/or controls.

Some applications for FMP include centralized backup for multiple circuits, or circuits which are designated to be responsive to demand response requests from a utility or are designated to be sensitive to the price of electricity or the availability of renewable energy. Other applications include UPS functionality where batteries are used to sustain power delivery during a power outage, and non-critical loads must be shed over time to prioritize critical loads. Load shedding may be necessitated by the presence of a fault that is detected by an FMP system, or it may be done for other critical or non-critical events, such as energy conservation or load deferment.

In some cases, the automatic disabling of loads in response to a grid power failure may be disruptive to ongoing operations or critical circuits. For example, during a grid outage, a computer user may wish to back-up their machine before allowing the power provided to that machine to be shut down. A machine operator may wish to clear their machine of work in progress before allowing it to be shut down. In another example, a refrigeration system may be detecting an unsafe temperature condition which requires that the refrigeration unit continue to receive power for short intervals of time to maintain a maximum safe setpoint temperature, albeit above its normal operating temperature.

While it is possible to communicate with an FMP power transmitter over an independently powered IP network, it is also desirable to provide displays and controls which are proximal to loads, which may be affected by a load shedding event. In this case it is desirable to continue to provide power to the controls at all times, even if one or more primary loads have been shed.

In systems where an FMP transmitter and associated FMP receiver are supplied by the same vendor or vendors with full interoperability, it is possible for the transmitter to notify the receiver through messaging that it should disconnect its load and therefore the transmitter can continue to provide only minimal power to the circuit for control purposes. However, in multi-vendor systems, this level of interoperability may not be available, and the transmitter will need to shed loads directly without communicating with the receivers in advance.

The power controller of this disclosure will enable continued remote-control powering and functionality even following a load shedding event. Also, in cases where a high impedance fault is detected, such as an animal or human coming in contact with the transmission line, it may be desirable to display the nature of the fault condition at the load or loads. The power controller of this disclosure will enable continued remote display powering even following a sustained fault condition.

Fault Managed Power (FMP) systems have a number of hard requirements for functional safety along with a number of desirable requirements for product functionality. FMP Power transmission lines must be unconditionally safe with regards to human contact. Any contact across the transmission lines or from one or both transmission lines to ground with sufficiently high fault voltage or current must be detected within milliseconds, and harmful voltages and currents discontinued. Upon startup and following a detected fault condition, the transmission line must be probed in a safe manner (e.g. in a low power mode) until the power transmitter is able to ascertain that no fault conditions exist on its transmission line, and before continuous full power operation is restored to the line. In addition, if one or more FMP receiver(s) in aggregate exceed the current suppling capacity of the FMP transmitter channel or the transmission line, then the FMP transmitter must detect a fault condition and enter a fault mode.

The above-described features are required for any FMP transmission system. However, certain other features of an FMP system are desirable and are provided by the power controller of this disclosure, including supporting continuous powering of remote displays and or controls with communications, even if power to the FMP receivers/loads is inhibited due to dynamic load management or due to a detected high impedance fault condition.

FIG. 1A depicts a block diagram of a FMP transmission system 100*a*, including a digital electricity or FMP controller 110 electrically connected in parallel to FMP transmission line 120 to which is also connected a single FMP receiver 130 configured to power load 140. FMP transmitter 150, which is fed by AC mains, is configured to energize transmission line 120 to power FMP receiver 130 configured to power load 140. In similar embodiments, the FMP transmitter 150 may be fed by a DC input such as an AC/DC rectifier, DC/DC converter, or a battery bank, where the DC voltage may be at any level supported by the input specifications of the FMP transmitter 150. Additional controllers may be connected to FMP transmission line 120, such as controller 110'. For example, they may be located near FMP receivers and loads so human operators may interact with the controllers to understand the status of the transmission line or the controllers may include one or more sensors and may be placed in certain locations to take and communicate measurements.

In a similar system shown in FIG. 1B, there is an FMP transmission system 100*b*, also including digital electricity controller 110 electrically connected in parallel to FMP transmission line 120. However, in addition to FMP receiver 130 configured to power load 140, there are also included FMP receivers 160 and 180 configured to power loads 170 and 190, respectively. FMP transmitter 150, which is fed by AC mains, is configured to energize transmission line 120. In similar embodiments, the FMP transmitter 150 may be fed by a DC input such as an AC/DC rectifier, DC/DC converter, or a battery bank, where the DC voltage may be at any level supported by the input specifications of the FMP transmitter 150. Additional controllers may be connected to FMP transmission line 120, such as controller 110'.

Figure 2A:
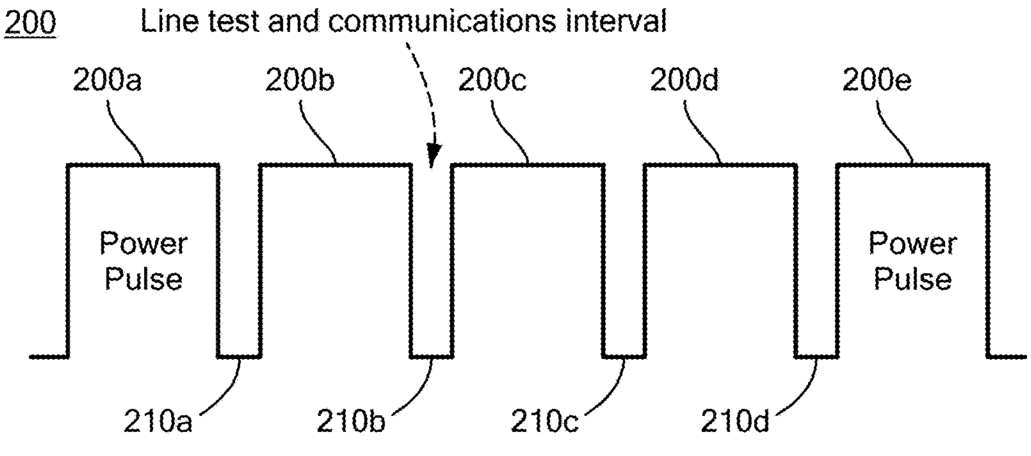
FIG. 2A depicts a stream of DC power pulses with a high amplitude and a high duty cycle (high-power mode) delivered from a FMP transmitter to one or more remote FMP receivers as shown in FIG. 1B.

In normal FMP operation, as shown in FIG. 2A, a continuous stream 200 of high-power DC power pulses 200*a*-200*e*, e.g. with an amplitude greater than 60 volts and with narrow gaps 210*a*-210*d* in between (i.e. a high duty cycle), are delivered from a FMP transmitter, such as FMP transmitter 100 FIG. 1*b*. High voltage may be defined as being above 60 volts in dry conditions and above 30 volts in wet conditions and is further limited or alternatively defined by industry standards. For example, the current publication of UL1400-1 specifies Fault Managed Power as limited to a maximum of 450 volts. This may be referred to as the high-power mode of operation. It should be noted that the duty cycle must be such that there is sufficient time to monitor and detect fault conditions on the transmission line, as is known in the art.

Pulse stream 200 is delivered to remote FMP receivers 130, 160, 180 across FMP transmission line 120, which may be a class two transmission line, such as CAT5 or CAT6 cable. When a fault is detected, the continuous stream of high voltage pulses from transmitter 150 is terminated and the respective loads 140, 170 and 190 are disconnected from their respective receivers, thereby terminating the high-power mode of operation.

Figure 2B:
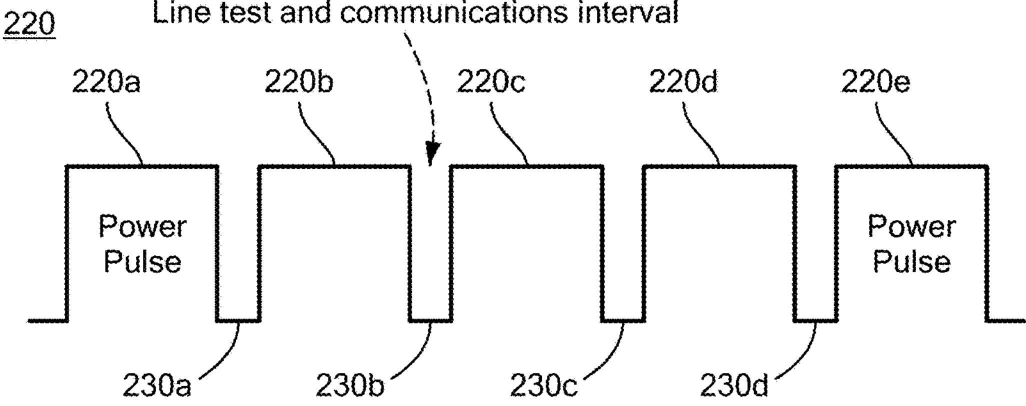
FIG. 2B depicts a stream of DC power pulses with a relatively low amplitude and a high duty cycle (low power mode) delivered from a FMP transmitter to one or more remote FMP receivers as shown in FIG. 1B.

To enable automatic line recovery, in the preferred embodiment, a low power operating mode is initiated. A first low power operating mode described herein uses a continuous stream 220 of low voltage pulses 220*a*-220*e*, FIG. 2B, to probe the line and to power remote power controllers according to this disclosure. Between low voltage pulses 220*a*-220*c* are narrow gaps 230*a*-230*d* (i.e. a high duty cycle) during which the transmission line is monitored to detect if the fault condition previously detected on the transmission line has been cleared. Low voltage means below 60 volts in dry conditions and below 30 volts in wet conditions, but it may be as low as 12 volts. This is a low enough voltage to not harm humans in the case of a cross line or line to ground fault. This signal must also avoid causing fires by limiting the current or by employing an inline fault detection method such as the one taught in Eaves 2012.

In some embodiments these low voltage pulses will enable power controller loads of several watts to be safely supplied while operating in low voltage mode. The transmitter will continue to probe the transmission line in low power mode until it is detected that the fault condition has been cleared and the transmitter is able to revert to high-power mode of operation as depicted in FIG. 2A. Thus, the power controller of this disclosure may be operated in both the high-power mode and the low power mode of the FMP transmitter.

Figure 2C:
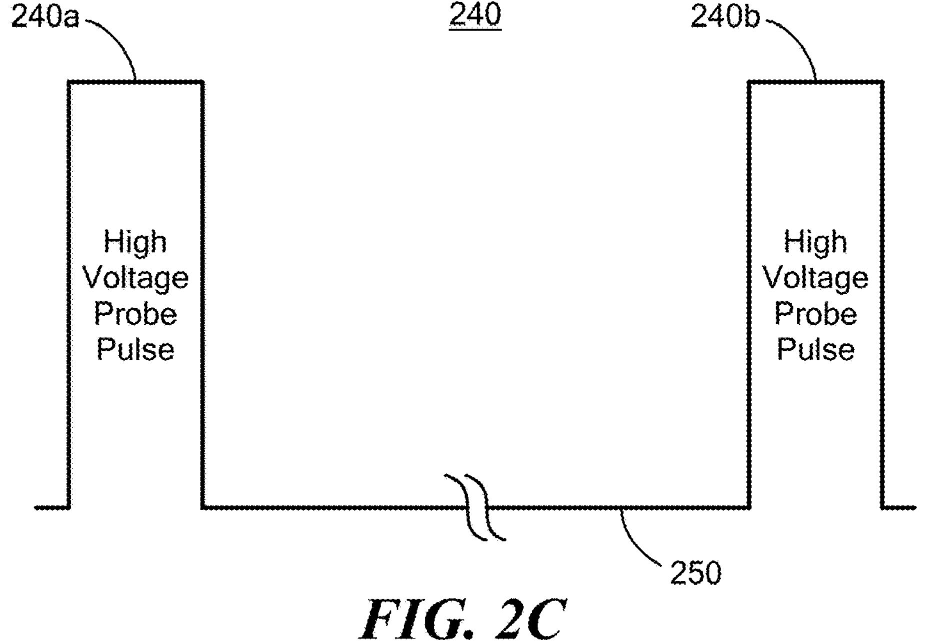
FIG. 2C depicts an alternative low power mode stream of DC power pulses with a relatively high amplitude and a low duty cycle delivered from a FMP transmitter to one or more remote FMP receivers as shown in FIG. 1B.

An alternative low power mode embodiment is depicted in FIG. 2C, where a continuous stream 240 of high voltage pulses 240*a*-240*b* having a very low duty cycle is shown. The aggregate delivered energy of the high voltage pulses is still low enough not to harm a human in the event of a cross line or line to ground fault or to provide enough heating to cause a fire. High voltage may be defined as being above 60 volts in dry conditions and above 30 volts in wet conditions and is further limited or alternatively defined by industry standards. Regarding the duty cycle, an appropriate testing pulse rate might be once per second or once per 3 seconds in order to meet UL 1400-1 specifications, whereas normal FMP operations, as depicted in FIG. 2A, typically operate at around 1,000 pulses per second.

The rectified power from either the low voltage, high duty cycle pulses (FIG. 2B) or the high voltage, low duty cycle pulses (FIG. 2C) will be sufficient to provide the needed power to operate one or more power controllers, however, not enough to cause an injury or a fire. In some embodiments, only a few microwatts are required to support a small LCD display and push buttons, as might be required for power controller 110.

The FMP controller herein may continue to operate in low power mode, with pulses even in the presence of a detected fault condition provided the impedance produced by the fault on the FMP transmission line does not cause the low power mode pulses to be below the minimum operating voltage for the FMP controller.

Figure 3:
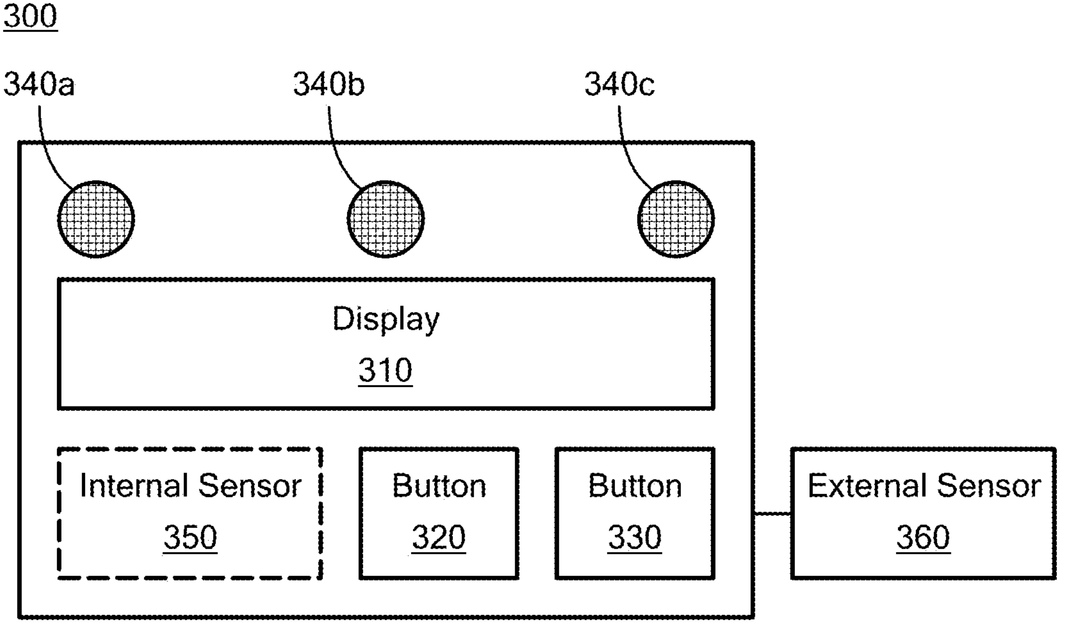
FIG. 3 is a front view of the interface of a digital electricity controller according to an aspect of this disclosure.

One embodiment of an interface 300 of a power controller 110 is shown in FIG. 3. In this example, interface 300 includes a display 310 for visually communicating data and information to a user. There may be an input device, such as one or more buttons, buttons 320 and 330 that allow a user to input basic information or requests. Of course, the buttons could be replaced with a pad having alphanumeric characters, for inputting more detailed information/requests. Interface 300 may include one or more LEDs or speakers e.g. LEDs or speakers 340*a*, 340*b*, and 340*c*, so information and data may be communicated visually or audibly to a user.

In a basic configuration of a controller 110 and interface 300, it may be used to request re-enablement of the transmission line which was disconnected due to a load shedding event. The re-enablement may be dependent upon the state of the centralized batteries, and the request may be accepted or denied. In another case, the controller may warn the operator that a power down event is imminent through beeping, flashing and/or a visual message. The message might include text as to why the power is about to be shut down or simply that it will be shut down. The user may have push button controls to delay the power-down event, or centralized battery permitting, to prevent the power down event. Following a power down event, the user may be able to request power to be restored to the circuit, assuming sufficient power is available.

In another embodiment of controller 110, additional functionality may be implemented including sensing functionality by including one or more sensors, such as internal sensor 350 or external sensor 360, that take measurements at a location distant to the transmitter (at the controller) and send the data back to the transmitter. Sensors that take any number of measurements, such as temperature, humidity, ambient light intensity, sound pressure level, RF activity, may be used. This data could be used in some automated fashion by the transmitter or other controllers on the system, or it could be reported to the user to facilitate the user making an informed decision regarding power management. For example, instead of sending the data to a transmitter exclusively, such a sensor could report data to a receiver that manages the information, or it could be reported directly to a user at the power controller (via the display, the LEDs, or the speakers) to aid the user in making decisions regarding power management.

Referring to FIG. 2A, in normal FMP operation, a continuous stream 200 of high-power DC power pulses 200*a*-200*e*, with a high duty cycle, are delivered from FMP transmitter 100 FIG. 1B to FMP transmission line 120. The intervals between pulses, e.g. 210*a*-210*d*, are used to detect if a fault condition exists. The means to do this are taught in Eaves U.S. Pat. No. 8,781,637. In particular, when both ends of the transmission line enter a high impedance state (i.e. at the transmitter and receivers), a fault condition may be detected by observing the voltage decay during the disconnection interval. If there is no crossline fault or fault to ground, then the line capacitance or small amount of capacitance present at one or more receivers or transmitters is sufficient to prevent significant decay of the line voltage. If there is a fault, then the voltage will droop throughout that interval at a rate which is dependent upon the line-to-line resistance and the line capacitance.

Figure 4:
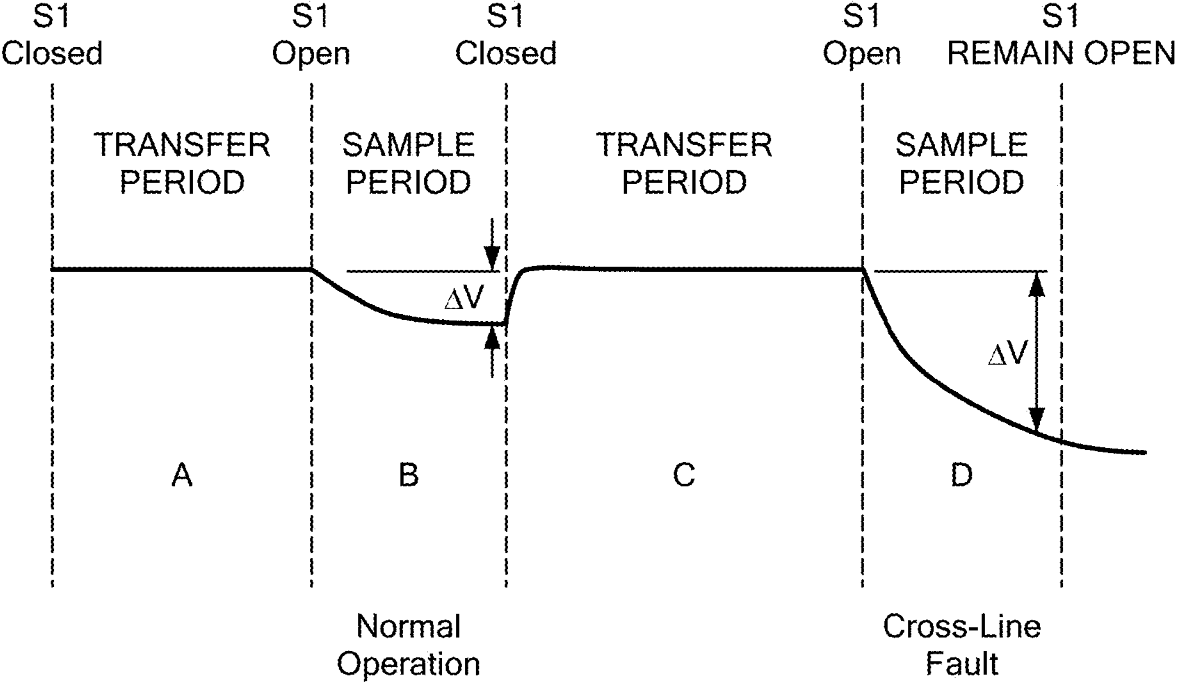
FIG. 4 is an illustration of a PET voltage waveform according to an aspect of this disclosure.

This is exhibited in FIG. 4, which shows an example waveform of steady-state system operation of a FMP system, according to aspects of this disclosure. During transfer periods A and C, a switch ($S_1$) of transmitter 150, FIG. 1A and 1B, is closed (set to a low-impedance state) and energy flows through the transmission line 120 to any connected receivers 130, 160, 180 and their attached loads 140, 170, 190. The switch ($S_1$) is not depicted in FIGS. 1A and 1B; however, it is implemented actively (via an electrically controlled switch such as a FET, BJT, etc.). During sample periods B and D transmitter switch ($S_1$) of transmitter 150 is opened (set to a high-impedance state). Similarly, any connected receivers isolate their attached loads either passively (via reverse blocking action of diodes) or actively (via an electrically controlled switch such as a FET, BJT, etc.) switching from the transmission line 120. The transmitter 150 may be configured to perform one or more of the FMP/PET protocol methods taught in Eaves 2012 to determine whether a fault is present.

During sample period B, under normal operation, when the transmitter switch ($S_1$) of transmitter 150 is open (set to a high-impedance state) energy stored in the capacitance of transmission line 120 and any connected receiver capacitance decays at a rate inversely proportional to the aggregate values of the cross-line resistance of the transmission line and any cross-line resistance within transmitter 150 and receivers 130, 160, 180. If there is a relatively small voltage drop, v, within pre-determined limits (according to the applicable PET protocol) this indicates that no fault was detected. In this case, at the end of sample period B, transmitter switch ($S_1$) of transmitter 150 is closed to connect the transmission line 120, to ultimately deliver energy to the attached loads on any connected receivers during transfer period C. As shown in sample period D, when transmitter switch ($S_1$) is open, a more significant transmission line voltage decay, V, indicating a fault condition (e.g. a crossline fault) is detected. It could also indicate that the load type connected to the transmission is incompatible with FMP power. In either case, at the end of sample period D, the transmitter switch ($S_1$) of transmitter 150 remains in the open state to prevent feeding power into a fault. Further fault detection regarding excessive line capacitance is taught by Mlyniec 2017 and is complementary to the above-described method. These methods are further refined for comprehensive fault protection in Casey 2024.

As described above transmitter 150 will then switch from high-power mode of operation to low power mode of operation, until the fault is cleared or until a load shedding event is over, in either case enabling a return to high-power operation mode.

Figures 5A, 5B:
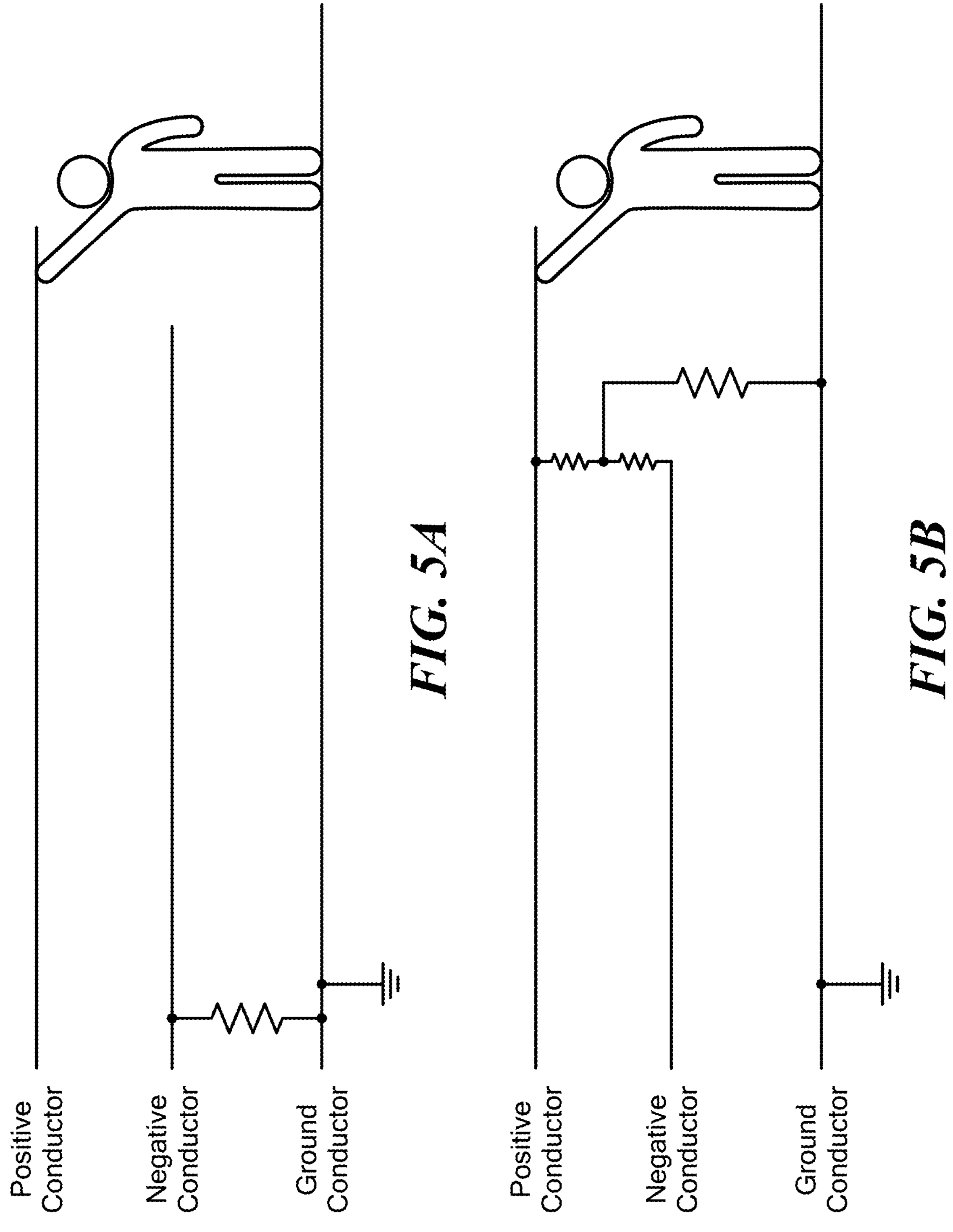
FIG. 5A depicts a human touching the hot side of an FMP transmission line and contacting ground, thereby causing a fault, wherein there is a resistor applied between the common conductor and ground to detect the fault.
FIG. 5B exhibits a human touching the positive side of an FMP transmission line and ground, thereby causing a fault, wherein there are resistors between the positive conductor and the negative conductor and a resistor to ground to limit the fault current. A human touching either the positive conductor or the negative conductor along with ground will be considered a fault condition.

FIG. 5*a* exhibits a human touching the hot side of an FMP transmission line and ground. The common side of the transmission line has a resistor to ground to enable detection. This resistor should be about 10% of the highest impedance fault condition, which needs to be detected for functional safety. A human with dry hands exhibits about 5,000 ohms of impedance between their hands. A resistance at or below 500 ohms is therefore appropriate. In another embodiment, the ground conductor can be connected to both the positive and negative conductors (i.e., analogous to the hot and common conductors in embodiments wherein one conductor is tied to ground through a low impedance) through a high-impedance center-tie configuration as shown in FIG. 5*b*. In such a configuration, any human contact between ground and either the hot or common conductor is inherently current limited to safe levels, thereby not requiring any fault detection in such scenarios.

Figure 6:
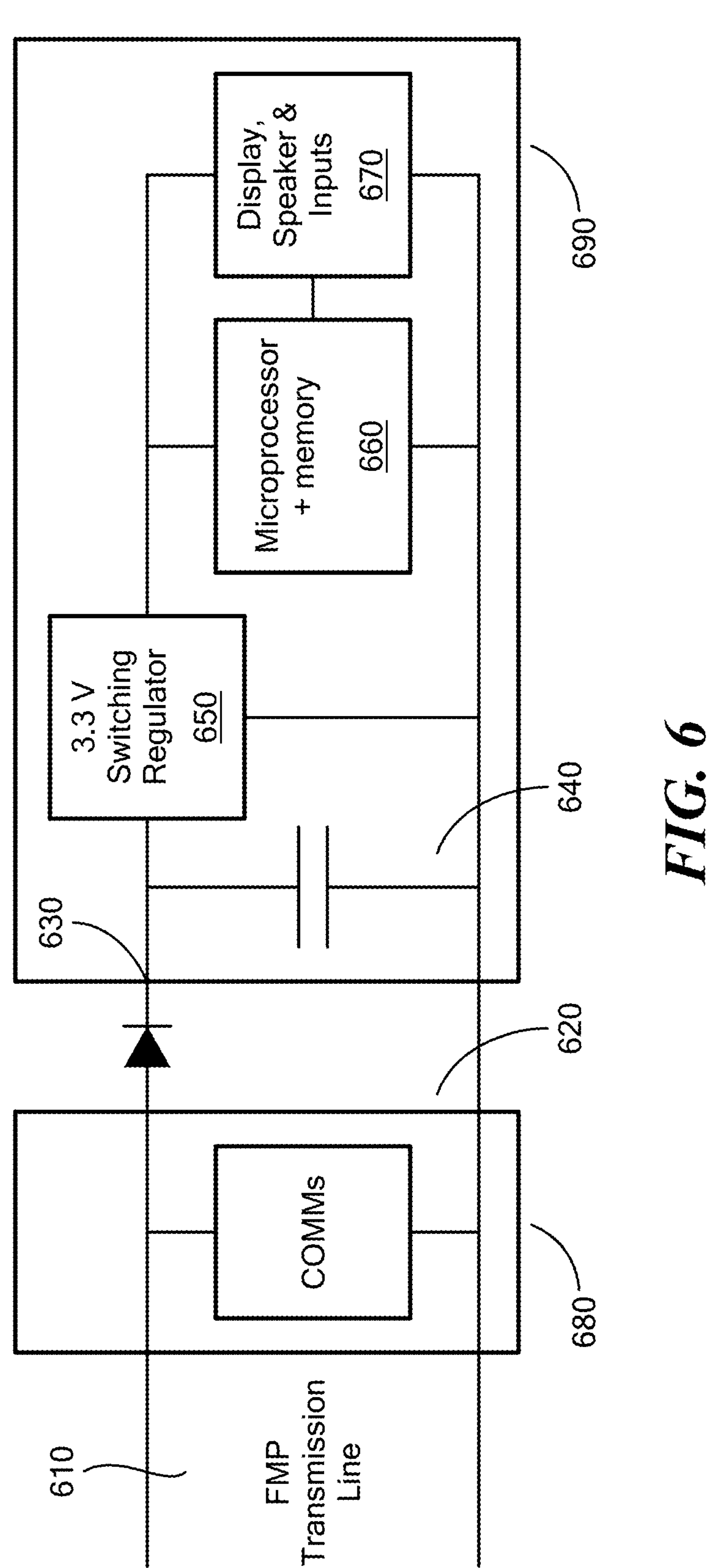
FIG. 6 is a schematic block diagram of an embodiment of the digital electricity controller of this disclosure.

A schematic block diagram of an implementation of a power controller 600 according to this disclosure is show in FIG. 6. Power controller 600 includes an input port 610 which is configured to electrically connect in parallel to a FMP transmission line. In parallel across the input port is communication device 620, which may use inline communications to transmit and receive information over the transmission line to FMP transmitters and/or receivers. Communications device 620 is also electrically connected to the transmission line. Instead of communicating over the transmission line, the communication device 620 may modulate an RF signal to communicate using an RF technology such as Z-Wave or Zigbee. Other known in-band and out-of-band communication protocols, whether wired using additional conductors or wireless requiring no additional conductors connected between the transmitter and receiver can also be utilized when compatible.

Also connected to the input port 610, in series on the hot or positive conductor is a switch 630, which in this case is a diode configured to close/conduct when there is positive voltage across at a predetermined level. In other words, when the transmission line voltage is at the voltage of the transmitter in either high-power mode or low power mode it is forward biased, and it will conduct and connect the controller 600 to the transmission line. When the transmitter is not connected to the transmission line, i.e. the system is in a sample mode, the voltage across the switch 630 is reverse biased for electrically isolating the FMP transmission line during power sample periods. It should be noted that while switch 630 in this embodiment is a unidirectional diode, it could be implemented as a bi-directional diode. Switch 630 may also be implemented as a unidirectional or bi-directional transistor, FET, BJT, etc. Moreover, instead of connecting switch 630 to the positive conductor, it could be connected to the negative conductor or there could be a switch on both the positive and negative conductors.

There is a capacitance 640 connected in parallel across the input port 610 between the communications device 620 and the switch 630. The capacitance 640 stores charge from the transmission line when the switch 630 is closed and power from the transmission line is fed to switching regulator 650. When switch 630 is open, the stored charge from capacitance 640 is discharged to power switching regulator 650. Switching regulator 650 down converts the higher voltage from the transmission line or capacitance to a lower level, e.g. 3.3V, to provide an appropriate power level to microprocessor and memory circuit 660 and display, speaker, and input circuit 670 which are connected in parallel. Display, speaker and input circuit 670 is part of the interface 300 of FIG. 3 described above. It should be noted that circuit 670 need not include all three components, namely, a display, a speaker, and an input, as it could include only one or two of these components or multiples of one or more components. Microprocessor and memory circuit 660 is in communications with display and input circuit 670 and with communications device 620 to control these circuits and the data and information flow, to receive input data from a human operator, to present output data for the human operator to view on a display or to hear via audio output on speakers, and to transmit data to and receive data from the FMP transmitter, FMP receivers, or other power controllers on the transmission line.

Components within box 680 are directly connected to the FMP transmission lines and are considered part of the FMP front-end circuitry 680 within the controller 600. Components within box 690 are considered part of the controller output control and conditioning circuitry 690, which may be connected to or isolated from the FMP transmission line, as described below.

Figure 7:
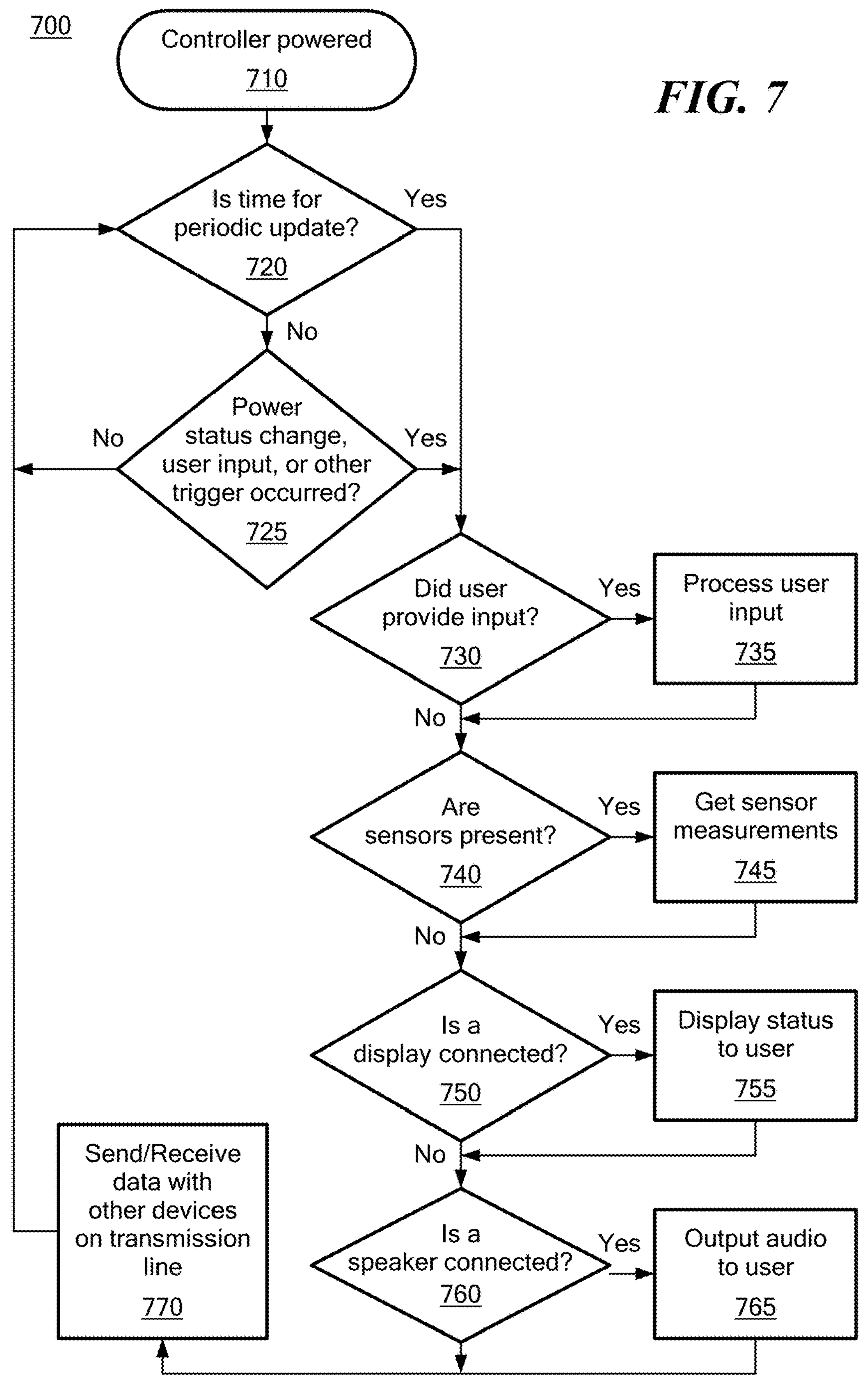
FIG. 7 is a flow chart describing the operation of the digital electricity controller of this disclosure.

A flow chart 700, FIG. 7, describes the operation of the power controller herein. At step 710, the power controller is powered up and in step 720 it determines if it is time for a periodic update of user input, display/audio output information, sensor measurements or other information/data that the controller may be designed to obtain and process. If it is not time for a periodic update, the controller proceeds to step 725 to query whether there is a power status change by the FMP transmitter, if a user has input information via the display and input circuit 670 of interface 300, or if some other trigger has occurred. If the system does not detect such a change, input, or other trigger, the system proceeds back to step 720 to determine if it is time for a periodic update.

If at step 720 it is determined that it is time for a periodic update or at step 725 a power change is detected, a user input is received, or another trigger has occurred, the system proceeds to step 730. At step 730, the system checks if there is a user input via the display and input circuit 670 and if there has been input, the input is processed at step 735. For example, if the user has input a request to not shed a load positioned near the controller, that information is processed and transmitted via the communication device 620 to the FMP transmitter. If the user did not provide input at step 730 or, if the user did provide input, but the input has been processed in step 735, the system proceeds to step 740.

At step 740, the system checks if there are sensors present in or associated with the controller and if there are, the sensor readings are obtained at step 745. For example, any number of measurements, such as temperature, humidity, ambient light intensity, sound pressure level, RF activity, may be sensed by an appropriate sensor built into or associated with the controller. If it is determined that there are no sensors at step 740 or, if there are sensors, but the sensor readings have been obtained in step 745, the system proceeds to step 750.

At step 750, the system checks if there is a connected display for the controller and if there is, the display is activated at step 755 to display information to the user. For example, the sensor measurements obtained at step 745 may be displayed. If it is determined that there is no display at step 750 or, if there is a display, but the display has been activated at step 755, the system proceeds to step 760.

At step 760, the system checks if there is a connected speaker for the controller and if there is, the speaker is activated at step 765 to output audio information to the user. If it is determined that there is no speaker at step 760 or, if there is a speaker, but the speaker has been activated to output audio at step 765, the system proceeds to step 770.

At step 770, any user input received at step 735 and/or sensor data obtained at step 745 may then be transmitted by communications device 620 to the FMP transmitter, FMP receivers, or other power controllers on the FMP transmission line. Also, any information, data, or messages from any device on the FMP transmission line is received for controller 600 to process and then the system returns to step 720 to begin the loop again. Of course, this implementation of controller is only exemplary and other implementations with different or additional functionality are within the scope of this disclosure.

As noted above, during start up or after a fault, a FMP transmitter will initially probe the FMP transmission line with pulses at a low voltage (e.g. 12 volts), low power mode. If significant line decay as exhibited in FIG. 4 is detected during the "off" or sample intervals, then the FMP transmitter will determine that the line is either in a fault condition or the load type is incompatible with FMP power. Low voltage pulsing with fault detection can provide benefits over non-fault-managed implementations by allowing a higher power level after the transmission line is deemed to be clear using low voltage probing.

For example, in a power over ethernet (PoE) system which is limited to 100 Watts, by incorporating fault detection with low voltage, the enhanced PoE system may be permitted to exceed 100 Watts at the same voltage level. Such power delivery at low voltage with fault detection can be applied not just to power controllers, but to any receivers or other devices connected to the line. While pulsing is an element of one form of fault managed power systems, low voltage with fault detection may be accomplished in any way that sufficiently limits the energy available to a potential fault and does not exceed the limited power draw allowed during load shedding and other such events. It is understood that, where other fault managed power systems may adopt alternative strategies of limiting available energy or limiting energy consumption, this embodiment of a power controller can be adapted to those power schemes to provide the functionality described in the present disclosure.

In an alternative embodiment, instead of or in addition to reducing the voltage of the pulses, the pulses may have a reduced duty cycle to limit the overall energy and charge available to a fault or to limit the overall energy available for distribution when such energy must be limited, such as when operating on a battery backup. Regardless of the energy limiting embodiment utilized, the controller may utilize low power design techniques to ensure it can continue to operate with the limited energy still available. Even if the available energy is insufficient for the controller to continue operating indefinitely, such low power design techniques such as low power components and low power modes including sleep modes can greatly extend the amount of time that the controller remains operational, and this may be enough time for critical functionality such as a controller giving the user the option to override such a state before the controller also loses power.

Another way to extend operation while connected to an energy-limited transmitter source is to increase the energy storage of the controller. Whether there is a local battery, a supercapacitor, or other capacitor or energy storage device present; this energy storage can be charged when the available power budget allows; and with enough time to charge, this can be used when operating in an energy-limited mode is required. This low power design and this increased energy storage can be implemented together, or only one can be chosen if that is sufficient for the design requirements.

There are circumstances where the transmitter will require dynamic load shedding. This may occur during a grid power fail event and where there is a limited supply of backup power such as batteries. In some cases, load shedding or load restoral will be controlled by the power transmitter sending messages to directed receivers to turn on or turn off their loads. In other cases, this may not be practical in that the receivers from one vendor may not be fully interoperable with the transmitters from a different vendor. Here an entire line may shed by terminating power delivery at the transmitter. Although the power to the transmission line of a given receiver may have been load shed, it is still desirable to remain in contact with one or more control panels proximal to a receiver or receivers.

While this disclosure primarily focuses on load shedding and pulse control managed by the transmitter, some similar embodiments can be adapted to the receiver. Such a receiver-side implementation is particularly applicable in systems where the receiver partially or fully controls the duration of pulses; and where the receiver can control whether power is transferred from the receiver to the load. A receiver in this case should have a state with minimal power draw that can be activated when power transfer to the load is discontinued. During a load shedding event, the receiver discontinues power transfer to the load, minimizes its own power draw, and can participate in reducing the energy transfer.

The receiver can control when it draws power through its own pulse control. The transmitter controls the voltage level, which can be a predefined waveform, or it can be dictated by the receiver through communication or other signaling. Regardless of whether the receiver dictates the voltage level, the receiver may synchronize or otherwise adapt to changes made by the transmitter to optimize its power draw for parameters including at least safe operations, avoidance of false positives in fault detection, or efficiency. Keeping the receiver powered can provide benefits, such as a faster recovery to start powering the load since some startup sequences may be skipped; and in some fault managed power systems, keeping the receiver powered may be required if the receiver is executing critical parts of the safety algorithm or is otherwise required to be present and powered in order for the safety algorithm to be executed properly. In this embodiment where the receiver controls the load shedding event, since the pulsing power draw is dictated by the recipient of the power, any device such as a controller or sensor would similarly need to pulse its power draw to avoid drawing power during sampling intervals.

It is understood that the present disclosure can be used in systems that utilize bidirectional power transfer, where the direction of power transfer between transmitter and receiver may change at different moments in time. Since the device such as a power controller herein does not depend upon the power transfer direction, the device will continue to function as described in the present disclosure.

There may be advantages to designing a power controller to be a hot-pluggable device. What is meant by "hot pluggable" is that the controller may be connected to or disconnected from an FMP transmission line while the FMP transmitter is transmitting power to the FMP transmission line without disrupting operation of the FMP transmitter. Instead of requiring a device installed at every desired location, which can become prohibitively expensive if there are a large number of locations with dedicated controllers, each location can instead provide a means to connect a controller on demand. This allows users to bring their own controllers and connect them when necessary, without requiring the transmitter to de-energize the transmission lines nor enter low-power mode to observe or control the system. This may allow even more convenient locations throughout the length of the transmission line due to the lower cost of providing a connection port compared to the cost of separate controllers installed.

U.S. application Ser. No. 18/504,603 (Lutz '603), discloses methods and apparatus for a hot-pluggable receiver. Lutz '603 is incorporated herein in its entirety by reference. Hot plug capabilities are desirable for both load flexibility and for the introduction of diagnostic tools in the event of fault or load shedding scenarios. The method and apparatus disclosed in Lutz '603 may be applied to the power controller disclosed herein to make it a hot-pluggable device. This can be used, for example, when a user notices a load does not have power unexpectedly, where the user could connect a power controller at a convenient location and get details regarding the event and possibly attempt action to alter the state of the system, such as turning the load back on. Regardless of whether there is a load shedding event or not, such a hot-pluggable device may be particularly useful for technicians who may want to tap into a line to make observations, enact controls, or to troubleshoot the system.

Figure 8:
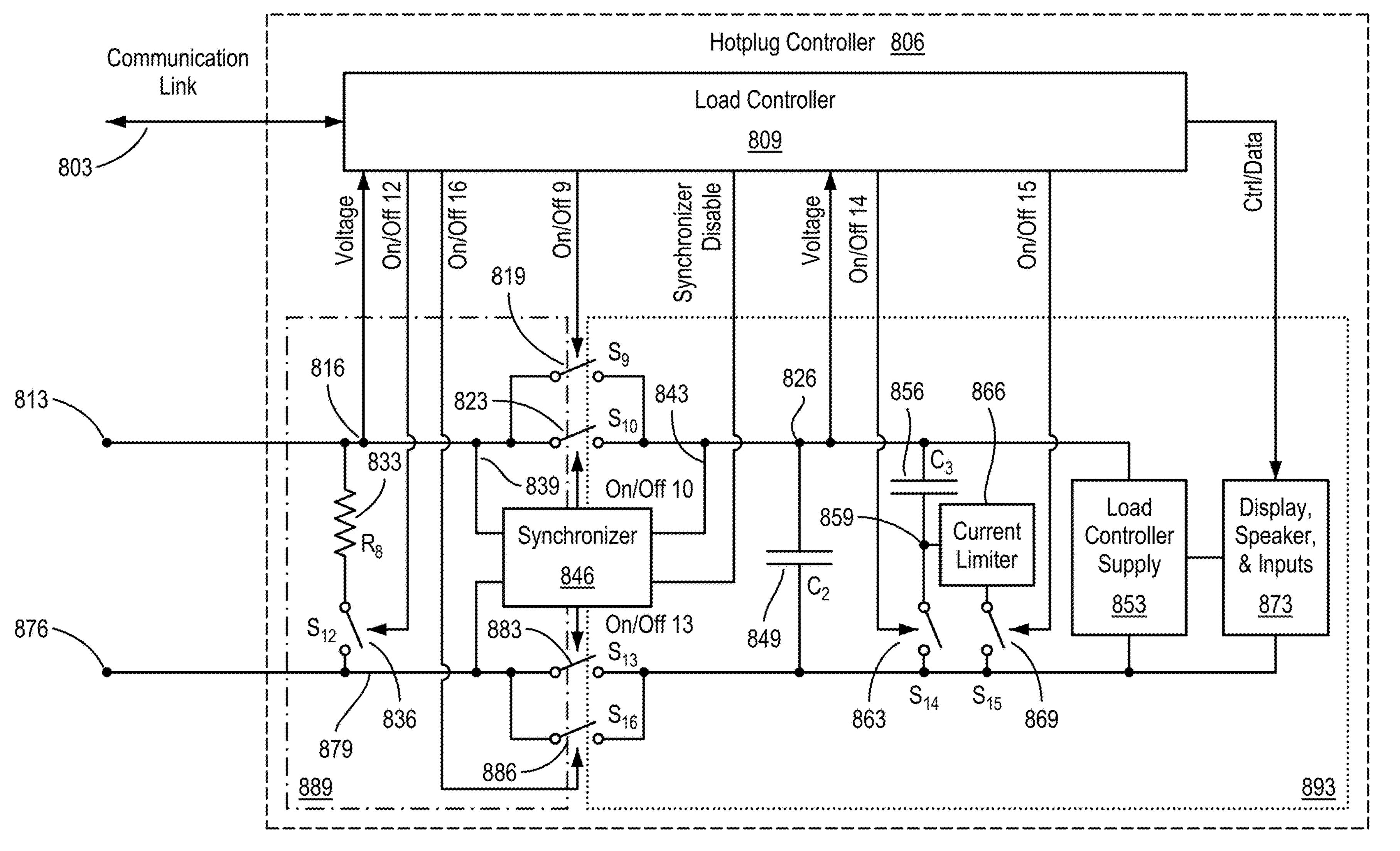
FIG. 8 is a block diagram of a hotplug circuit for use with the digital electricity controller according to an aspect of this disclosure.

FIG. 8 depicts an embodiment of a hot plug capable controller 806. This type of controller may have increased start-up input impedance and as a result the controller can be hot plugged/connected to an energized PET system with a transmitter and other receivers already operating, without causing any interruption to power delivery or compromising safety.

With the hot plug controller 806 switches ($S_9$) 819, ($S_{10}$) 823, ($S_{13}$) 883 and ($S_{16}$) 886 and synchronizer 846 are included to isolate the controller FMP front-end circuit 889 from the output control and conditioning circuit 893 in a bi-directional manner, compared to the diode in FIG. 4, which only isolates in a uni-directional manner. This increases start-up input impedance for controller 806 as compared to controller 600, FIG. 6, as all components within the output control and conditioning circuits 893 can be electrically disconnected from the FMP front-end circuit 889 regardless of the voltage across switches ($S_9$) 819, ($S_{10}$) 823, ($S_{13}$) 883 and ($S_{16}$) 886. As will be apparent to one skilled in the art, this circuit could be implemented with a single pair of switches, e.g. ($S_{10}$) 823 and ($S_{13}$) 883, operated under the control of synchronizer 846 (during start-up) and load controller 809 after start-up. In the simplest form, the circuit could be implemented with a single switch on the positive leg of the circuit, e.g. ($S_{10}$) 823.

While not shown in detail in FIG. 6, it should be noted that circuit components (other than those needed for hot plug capability) from FMP front-end circuit 889 and from the output control and conditioning circuit 893 depicted in FIG. 8 may be included in FMP front-end circuitry 680 and the output control and conditioning circuitry 690 of FMP controller 600. It is understood, however, that the front-end circuitry 680 and output control and conditioning circuitry 690 may include or exclude components to align with other embodiments in prior art including those applicable to FMP receivers, and one skilled in the art would be able to determine the compatibility of such a change. Current sensors may be implemented in the front-end circuitry 680 or the output control and conditioning circuitry 690 in order to support safety algorithm execution or to provide other features such as device protection or load metering. The front-end circuitry 680 could include a frequency modulation, phase detection, or load detection circuit to support different methodologies of achieving a FMP compliant system. The front-end circuitry 680 may remove the communication circuit and instead implement it in the output control and conditioning circuitry 690 if it is not required to be in direct electrical contact with the FMP transmission line, such as when an out-of-band communication protocol including Wi-Fi or Zigbee is chosen. The output control and conditioning circuitry 690 may include a load controller such as the one shown as load controller 809 in FIG. 8; and said load controller may execute operations in hardware, software, or both to be compatible with alternative FMP systems, such as those that require periodic receiver-side switching to isolate the front-end circuitry 680 from the output control and conditioning circuitry 690 or those that require any other receiver-side safety algorithm execution. These alternatives or supplements are similarly applicable to the front-end circuitry 889 and output control and conditioning circuitry 893 of the hot-pluggable controller provided they do not violate the design requirements to support hot-plug, such as any high-impedance or timing requirements. This is not intended to be an exhaustive list, but rather suggest the breadth of applicable adaptations that one skilled in the art could easily make.

The synchronizer circuit 846 allows the controller to start up from an unpowered state. It consumes only a small amount of current from the transmission lines which is at a magnitude below the level which the transmitter may detect a fault, with at least a minimum level of margin included. This minimum level of margin would be defined such that the transmitter does not detect a fault that is not actually present by considering the current draw under normal conditions (i.e. the current drawn by the controller during the start-up process), the minimum level of fault sensitivity, and factors that can affect the measurement, such as tolerance of components, reasonable expected noise, and timing skew. This minimum level of margin should also consider the number of parallel controllers and/or receivers that are designed to be supported that may concurrently draw this magnitude of current due to their parallel configuration.

To meet the above impedance requirements, the start-up input impedance (which includes the front-end impedance) of the hot pluggable PET controller 806 may be at least two times (2X) higher than an impedance level that would induce or indicate a fault or prevent the transmitter from successfully completing soft start on the at least one energized PET transmission line. In order to provide more margin, the start-up input impedance may be greater than two times (2X) and may be up to or greater than one order of magnitude higher than an impedance level that would induce or indicate a fault on the at least one energized PET transmission line.

Once synchronized to the PET waveform (described below), the synchronizer circuit 846 allows current to flow to charge bootstrap capacitor ($C_2$) 849 and get load controller supply 853 running to supply power to load controller 809. Load controller supply 853 may include a down converter to regulate a higher input voltage down to the voltage level required by the load controller 809. This process may require a plurality of transfer and sample periods to start the load controller supply. Once the load controller supply 853 is running/operational, the load controller 809 disables the synchronizer circuit 846 and the load controller supply 853 powers load controller 809. In addition, load controller 809 begins switching the connected switches ($S_9$) 819 and ($S_{16}$) 886 during subsequent transfer and sample periods to complete the initialization operations before powering the load, in this case load 873 which is a display, speaker, and input device, equivalent to display, speaker, and input device 670, FIG. 6. The load controller has the ability retrieve data from device 670 and well as provide control of device 670, including holding it in a low power or off mode until the initialization operations are complete. This controller with high start-up input impedance allows for hot plug capability, meaning the controller can be connected to a running system with a transmitter and other controllers and/or receivers already operating without causing any interruption to power delivery or compromising safety. In other words, it does not draw an amount of current/power to cause the PET transmitter to incorrectly detect a fault.

For $C_2$ 849, with an effective crossline resistance of at most 100 kΩ and effective cross-line capacitance of at most 100 nF seen at the receiver front-end and an effective load controller supply resistance of at least 20 kΩ, the bootstrap capacitance would need to be at least 0.5 μF. With a single controller front-end receiving power at a duty cycle of 50% and a frequency of 1 kHz, with an effective load controller supply resistance of at least 20 kΩ, to tolerate no more than a 10V ripple, a bootstrap capacitance of at least 0.42 μF is required. Therefore, in this example, a bootstrap capacitance of at least 0.5 μF is required. Larger values can be used to further minimize ripple and provide margin, but the value should otherwise be minimized in order for operational capabilities to be optimized. A system with different parameters must recalculate these values accordingly.

For $C_3$ 856, with a load current of 5 A, a single controller front-end receiving power at a duty cycle of 50% and a frequency of 1 kHz, to tolerate no more than 10V ripple, a bulk capacitance of at least 125 μF is required. Larger values can be used to further minimize ripple and provide margin, but smaller values will optimize cost and component size as well as generally faster initialization times.

For capacitance sizing of both $C_2$ 849 and $C_3$ 856, the minimum amount of capacitance required to allow the controller to operate must be considered and the ability for the capacitance to be recharged during each transfer period based on the series resistance of the transmission line and any other impedances that would affect the charge rate of that capacitance must also be considered.

Figures 9, 10:
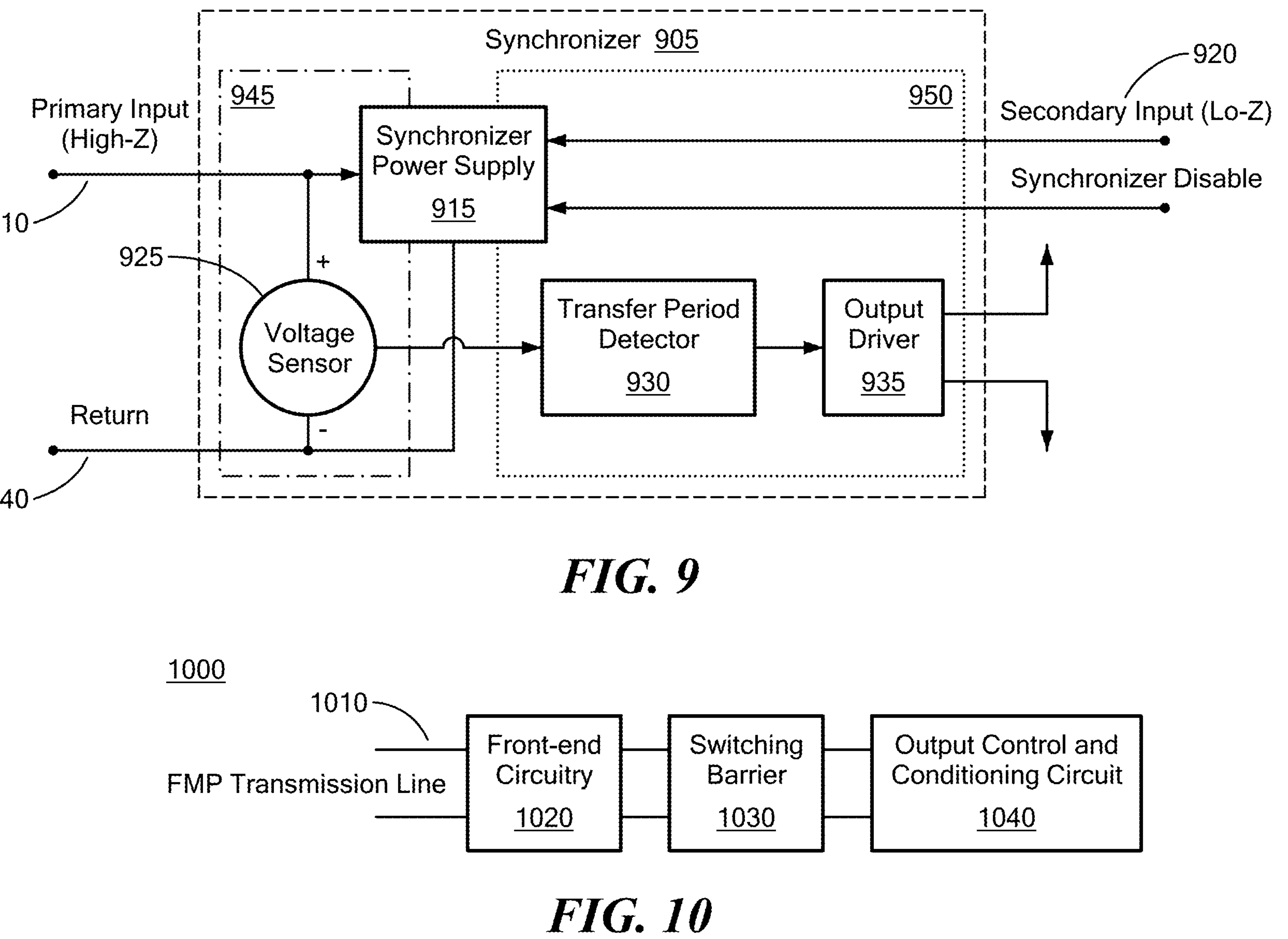
FIG. 9 is a detailed block diagram of the synchronizer of the hotplug circuit of FIG. 8.
FIG. 10 is a block diagram of a FMP receiver according to an aspect of this disclosure.

Referring now to FIG. 9 there is shown a detailed block diagram of the synchronizer circuit 846, within controller 806. Synchronizer circuit 846 includes voltage sensor 925 to measure the voltage across the transmission line via points 910 and 940. The transfer period detector 930 processes the output of the voltage sensor to detect the high dV/dt event across the transmission lines (see FIG. 4) occurring at the beginning of the transfer period. Once the start of the transfer period is detected, the transfer period detector instructs the output driver 935 to close the bypass switches ($S_{10}$) 823 and ($S_{13}$) 883 within the controller 806. Once a predetermined amount of time elapses, the transfer period detector 930 instructs the output driver 935 to open the bypass switches ($S_{10}$) 823 and ($S_{13}$) 883 within the controller 806, where the predetermined amount of time is at most the total duration of the transfer period but may be shorter to provide margin and consider other system design constraints.

These same techniques could be performed by analyzing current instead of voltage. For example, the synchronizer circuit 846 could place a small resistance across or in series with the transmission lines and measure the current flowing through the resistor. When the transmitter enters the transfer period, a high rate of change in the current flowing though the resistor could be measured.

A particular embodiment of transfer period detector 930 may consist of an ADC and microcontroller performing analysis of the voltage waveform. Said ADC and microcontroller may be implemented as part of the load controller 809 or as a separate circuit. Another embodiment may utilize comparators, discrete logic gates, and registers, and monostable timer circuits as a detection mechanism.

The voltage sensor 925, transfer period detector 930, and output driver 935 are powered from the synchronizer power supply 915. The steady state power draw of the supply via the primary input 910 is well below the level which could impact measurements made by the transmitter source controller. However, to run the voltage sensor 925, transfer period detector 930 and output driver 935, the synchronizer power supply 915 may need to source more energy than can be sourced directly from the transmission line via primary input 910 without causing measurement disturbances. Therefore, the secondary input 920 is connected after the bypass switch ($S_{10}$) 823 within the controller and serves as a lower impedance path to allow the synchronizer power supply 915 to maintain operation once synchronized with the transmitter.

Components within box 945 are directly connected to the PET transmission lines and are considered part of the PET front-end circuitry 889 within the receiver 806. Components within box 950 are considered part of the receiver output control and conditioning circuitry 893.

For completeness, a block diagram of the internal components of a FMP receiver, such as FMP receiver 130, FIGS. 1A and 1B, is shown in FIG. 10. FMP receiver 1000 is connected in parallel to transmission line 1010 via its front-end circuit 1020. Front-end circuit 1020 may include components like those shown in front-end circuit 680 of controller 600, FIG. 6, or it may be configured as a hot pluggable receiver and have components like those depicted in front-end circuit 889 of hot plug controller 806, FIG. 8. Front-end circuit 1020 is connected to output control and conditioning circuit 1040 via a switching barrier 1030. Output control and conditioning circuit 1040 may include or be connected to a load (not shown) and it may include components like those shown in output control and conditioning circuit 690 of controller 600 or like those depicted in output control and conditioning circuit 893 of hot plug controller 806. The switching barrier 1030 may be implemented in various ways, including as shown in the controller 600 or hot plug controller 806. Alternatively, FMP receiver 130 may be implemented in any suitable manner known in the art.

The various embodiments of the disclosure described above are intended to be merely exemplary; numerous variations and modifications will be apparent to those skilled in the art. All such variations and modifications are intended to be within the scope of the present disclosure as defined in any appended claims.

What is claimed is:

1. A method for operating a controller in a fault managed power (FMP) system, the FMP system including a FMP transmitter connected to a FMP transmission line, the FMP transmitter further connected to a power source and configured to transmit power in pulses, in a low power mode or a high-power mode, over the FMP transmission line during power transfer periods and to isolate the source from the transmission line during power sample periods, the controller comprising a FMP front-end circuit and an output control and conditioning circuit, the method comprising:

connecting the FMP front-end circuit of the controller electrically in parallel with the FMP transmission line;

receiving power by the FMP front-end circuit and the output control and conditioning circuit of the controller from the FMP transmission line when the FMP transmitter transmits power over the transmission line during power transfer periods, in both the low power mode and the high-power mode, to operate the controller;

electrically isolating the output control and conditioning circuit of the controller from the FMP front-end circuit and the FMP transmission line during power sample periods; and causing the controller to perform one or more of the following functions:

receive input data from a human operator;

receive sensor data from a sensor of the controller;

present output data for the human operator to observe; or transmit data to and receive data from the FMP transmitter.

2. The method of claim 1 wherein the FMP system includes at least one FMP receiver having an FMP front-end circuit and an output control and conditioning circuit, wherein the method includes connecting the FMP front-end circuit of the at least one receiver to the FMP transmission line and connecting the output control and conditioning circuit to a load.

3. The method of claim 2 including electrically connecting the output control and conditioning circuit of the at least one FMP receiver to the transmission line during power transfer periods when the FMP transmitter is transmitting in high-power mode and electrically isolating the output control and conditioning circuit of the at least one receiver from the FMP front-end circuit and from the transmission line during power transfer periods when the FMP transmitter is transmitting in low power mode.

4. The method of claim 3 including electrically isolating the output control and conditioning circuit of the at least one receiver from the FMP front-end circuit and from the FMP transmission line during power sample periods.

5. The method of claim 2 further including causing the controller to transmit data to and receive data from the at least one FMP receiver.

6. The method of claim 1 wherein the FMP system includes at least one additional controller and the method further includes causing the controller to transmit data to and receive data from the at least one additional controller.

7. The method of claim 2 wherein the FMP transmitter operates in the low power mode when the load associated with the at least one receiver is shed in response to the FMP transmitter or when a fault condition on the FMP transmission line is detected.

8. The method of claim 1 wherein the controller includes an interface having one or more of a display for the human operator to view data, a speaker to output data via audio to the human operator, and input controls for the human operator to input data.

9. The method of claim 1 wherein the sensor includes one or more of a temperature sensor, a humidity sensor, an ambient light sensor, a pressure sensor, and an RF sensor and the data includes one or more of temperature data, humidity data, ambient light data, pressure data, and RF data.

10. The method of claim 1 wherein transmitting data to and receiving data from the FMP transmitter includes bidirectionally communicating the data over the FMP transmission line using modulated data pulses during the sample periods.

11. The method of claim 10 wherein the modulated data pulses are modulated onto the FMP transmission line at a frequency greater than a frequency of the power sample periods.

12. The method of claim 1 wherein transmitting data to and receiving data from the FMP transmitter includes bidirectionally communicating the data using an out-of- band communication protocol.

13. The method of claim 1 wherein the FMP transmission line comprises a CAT5 or CAT6 cable.

14. The method of claim 1 wherein the FMP transmitter transmits pulses having a first voltage in the high-power mode.

15. The method of claim 14 wherein when the FMP transmitter transmits pulses operating in the low power mode, the method includes reducing the first voltage to a lower, second voltage.

16. The method of claim 14 wherein when the FMP transmitter transmits pulses operating in the low power mode, the method includes maintaining the first voltage for the pulses and reducing the duty cycle of the pulses.

17. The method of claim 7 wherein the controller continues to operate provided the detected fault condition does not produce an impedance on the FMP transmission line causing the low power mode pulses to be below a minimum operating voltage for the controller.

18. The method of claim 1 further comprising connecting the FMP front-end circuit of the controller to the FMP transmission line or disconnecting the FMP front-end circuit of the controller from the FMP transmission line while the FMP transmitter is transmitting power to the FMP transmission line without disrupting operation of the FMP transmitter.

19. A controller for use in a fault managed power (FMP) system, the FMP system including a FMP transmitter connected to a FMP transmission line, the FMP transmitter further connected to a power source and configured to transmit power in pulses, in a low power mode or a high-power mode, over the FMP transmission line during power transfer periods and to isolate the source from the transmission line during power sample periods, the controller comprising:

- a FMP front-end circuit configured to be connected in parallel to the FMP transmission line;
- an output control and conditioning circuit having an input port and including:
  - a capacitance connected in parallel across the input port of the output control and conditioning circuit;
  - a voltage regulator having an input and an output, the input connected to the capacitance and to the input port of the output control and conditioning circuit;
  - an interface device connected to the output of the voltage regulator;
  - a processor and memory connected to the output of the voltage regulator, the processor in communication with the interface device and a communication device, the memory storing instructions that when executed by the processor cause one or more of the following:
    - the interface device to receive input data from a human operator or a sensor,
    - the interface device to present output data for the human operator to observe, or
    - the communication device to transmit data to and receive data from the FMP transmitter;
- at least one switch connected between the FMP front-end circuit and the input port of the output control and conditioning circuit; wherein the at least one switch is configured to connect the output control and conditioning circuit to the FMP front-end circuit and the FMP transmission line to receive power from the FMP transmission line when the FMP transmitter transmits power, in both the low power mode and the high-power mode, and for electrically isolating the output control and conditioning circuit from the FMP front-end circuit and the FMP transmission line during power sample periods.

20. The controller of claim 19 wherein the FMP system includes at least one FMP receiver having an FMP front-end circuit and an output control and conditioning circuit, wherein the FMP front-end circuit of the at least one receiver is connected to the FMP transmission line and the output control and conditioning circuit of the at least one receiver is connected to a load.

21. The controller of claim 20 wherein the output control and conditioning circuit of the at least one FMP receiver is configured to connect to the transmission line during power transfer periods when the FMP transmitter is transmitting in high-power mode and is configured to electrically isolate the output control and conditioning circuit of the at least one receiver from the FMP front-end circuit and from the transmission line during power transfer periods when the FMP transmitter is transmitting in low power mode.

22. The controller of claim 21 wherein the output control and conditioning circuit of the at least one FMP receiver is configured to electrically isolate the output control and conditioning circuit of the at least one receiver from the FMP front-end circuit and from the FMP transmission line during power sample periods.

23. The controller of claim 20 wherein the processor causes the communication device to transmit data to and receive data from the at least one receiver.

24. The controller of claim 19 wherein the FMP system includes at least one additional controller, and the processor causes the communication device to transmit data to and receive data from the at least one additional controller.

25. The controller of claim 20 wherein the FMP transmitter operates in the low power mode when the load associated with the at least one receiver is shed in response to the FMP transmitter or when a fault condition on the FMP transmission line is detected.

26. The controller of claim 19 wherein the interface includes one or more of a display for the human operator to view data, a speaker to output data via audio to the human operator, and input controls for the human operator to input data.

27. The controller of claim 19 wherein the sensor includes one or more of a temperature sensor, a humidity sensor, an ambient light sensor, a pressure sensor, and an RF sensor and the data includes one or more of temperature data, humidity data, ambient light data, pressure data, and RF data.

28. The controller of claim 19 wherein the processor causes the communication device to bidirectionally communicate the data over the FMP transmission line using modulated data pulses during the sample periods.

29. The controller of claim 28 wherein the processor causes the communication device to modulate data pulses onto the FMP transmission line at a frequency greater than a frequency of the power sample periods.

30. The controller of claim 28 wherein the processor causes the communication device to bidirectionally communicate the data using an out-of-band communication protocol.

31. The controller of claim 19 wherein the FMP transmission line comprises a CAT5 or CAT6 cable.

32. The controller of claim 19 wherein the FMP transmitter transmits pulses having a first voltage in the high-power mode.

33. The controller of claim 32 wherein when the FMP transmitter transmits pulses operating in the low power mode, the FMP transmitter reduces the first voltage to a lower, second voltage.

34. The controller of claim 32 wherein when the FMP transmitter transmits pulses operating in the low power mode, the FMP transmitter maintains the first voltage for the pulses and reduces the duty cycle of the pulses.

35. The controller of claim 25 wherein the controller continues to operate provided the detected fault condition does not produce an impedance on the FMP transmission line causing the low power mode pulses to be below a minimum operating voltage for the controller.

36. The controller of claim 19 further comprising a synchronizer device interconnecting the FMP front-end circuit and the output control and conditioning circuit to enable connecting the FMP front-end circuit to the FMP transmission line and disconnecting the FMP front-end circuit of the controller from the FMP transmission line while the FMP transmitter is transmitting power to the FMP transmission line without disrupting operation of the FMP transmitter.

37. The controller of claim 19 wherein the FMP front-end circuit includes the communication device which is configured to transmit data to and receive data from the FMP transmitter.

* * * * *